United States Patent
Benlolo et al.

(10) Patent No.: US 11,190,638 B2
(45) Date of Patent: Nov. 30, 2021

(54) DETECTION AND PREVENTION OF UNWANTED CALLS IN A TELECOMMUNICATIONS SYSTEM

(71) Applicant: Tata Communications (America) Inc., Herndon, VA (US)

(72) Inventors: Robert Benlolo, Cote-Saint-Luc (CA); Carlos Miranda, Deerfield Beach, FL (US); Alan Tai, Marlboro, NJ (US); Kumar Thirumalaiappan, Edison, NJ (US)

(73) Assignee: Tata Communications (America) Inc., Herndon, VA (US)

( * ) Notice: Subject to any disclaimer, the term of this patent is extended or adjusted under 35 U.S.C. 154(b) by 0 days.

(21) Appl. No.: 16/481,647

(22) PCT Filed: Feb. 1, 2018

(86) PCT No.: PCT/US2018/016470
§ 371 (c)(1),
(2) Date: Jul. 29, 2019

(87) PCT Pub. No.: WO2018/144745
PCT Pub. Date: Aug. 9, 2018

(65) Prior Publication Data
US 2019/0394331 A1 Dec. 26, 2019

Related U.S. Application Data

(60) Provisional application No. 62/454,522, filed on Feb. 3, 2017.

(51) Int. Cl.
*H04M 3/436* (2006.01)
*H04M 3/42* (2006.01)

(52) U.S. Cl.
CPC ....... *H04M 3/436* (2013.01); *H04M 3/42059* (2013.01); *H04M 3/42102* (2013.01)

(58) Field of Classification Search
CPC ............. H04M 3/436; H04M 3/42059; H04M 3/42102
See application file for complete search history.

(56) References Cited

U.S. PATENT DOCUMENTS 7,155,417 B1 * 12/2006 Sagar ..................... G06Q 20/16
705/68
9,729,727 B1 * 8/2017 Zhang .................. H04M 15/47
(Continued)

OTHER PUBLICATIONS

Authorized Officer: Lee W. Young, International Search Report and Written Opinion issued in PCT application No. PCT/US2018/016470, dated May 17, 2018, 10 pp.
(Continued)

*Primary Examiner* — Nafiz E Hoque
(74) *Attorney, Agent, or Firm* — Kaplan Breyer Schwarz, LLP

(57) ABSTRACT

A method that detects unwanted calls based on information shared between a first telecommunications network provided by a first service provider and a second service provider providing a second telecommunications network including receiving, by a data-processing system, a request to provide a telecommunications service to the first telecommunications network, the request being received by the first telecommunications network from a user of the first telecommunications network through a first gateway, and wherein the request comprises a calling party identification that identified a calling party and a called party identification that identified a called party. The method further includes examining, by the data-processing system, statistics relating to requests for telecommunications services; and generating, by the data-processing system, a first signal when the called (Continued)

party identification in the request appears in the statistics in excess of a predetermined first number of instances within a predetermined first time interval.

28 Claims, 6 Drawing Sheets

(56) References Cited

U.S. PATENT DOCUMENTS

| | | |
|---|---|---|
| 2005/0053215 A1 | 3/2005 | Bedingfield, Sr. |
| 2005/0182745 A1 | 8/2005 | Dhillon et al. |
| 2009/0010168 A1* | 1/2009 | Yurchenko .............. H04L 12/66 370/237 |
| 2009/0282094 A1 | 11/2009 | Hawkins |
| 2013/0336169 A1 | 12/2013 | Tai et al. |
| 2015/0003600 A1* | 1/2015 | Bucko .................... H04M 3/436 379/210.02 |
| 2015/0086001 A1 | 3/2015 | Farrand et al. |
| 2016/0309024 A1 | 10/2016 | Quilici et al. |

OTHER PUBLICATIONS

Extended European Search Report issued in EP Patent Application No. 18748345 dated Oct. 13, 2020.
Examination Report issued in counterpart Indian patent application No. 201917034214, dated Jul. 26, 2021, 5 pp.
Examination Report issued in counterpart Australian patent application No. 2018217101, dated Aug. 24, 2021, 4 pp.

* cited by examiner

DETECTION AND PREVENTION OF UNWANTED CALLS IN A TELECOMMUNICATIONS SYSTEM

RELATED APPLICATION INFORMATION

This application claims the benefit of U.S. Provisional Application No. 62/454,522 filed Feb. 3, 2017, which is incorporated herein by reference

FIELD OF INVENTION

The present invention relates to telecommunications in general, and, more particularly, to call routing analysis.

BACKGROUND

The field of Internet telephony has proven to be a viable technology and is evolving at an ever-increasing rate. Moreover, it is now common to use any type of telephone terminal, handset, cell phone, etc. to initiate or receive a Voice over Internet Protocol (VoIP) call by connecting to the public switched telephone network (PSTN) to access a gateway, the call travelling through the Internet to a remote party via one or more gateways.

The PSTN is a circuit switched network that assigns a dedicated communication line to a user with which to complete the telephone call, and the user can utilize the assigned resource of the PSTN in any way he chooses. It is understood that the user is paying for the use of the dedicated resource of the PSTN. While the circuit switched approach of the PSTN system is not necessarily the most efficient system in terms of call traffic (i.e., it does not make use of the "dead space" common in a conversation), it is relatively easy to ensure that information destined for a particular user is delivered. The PSTN provides a dedicated line to complete the transaction.

The Internet is a packet switched network in which communication is accomplished by breaking the transmitted data into "packets", based primarily on communication content, and interleaving the packets to best utilize the bandwidth available at any given time on the Internet. When the packets reach their intended destination, they must be reassembled into the originally transmitted data. Loss of packets, and thus data, occurs frequently in such a network, and the ability of the network to successfully transmit information from one point in the network to another determines the quality of the network. For inter-computer communication transactions involving non-real-time data, the ability to transmit packets and retransmit any packets that are perceived to have been dropped is not a severe limitation and may not even be perceived by the user of the system. However, in a voice communication transaction, the delay required to retransmit even one data packet may be perceived by a user.

A system of gateways disposed on the Internet facilitates VoIP telephony by permitting the gateways to act as protocol bridges between the PSTN and the Internet. Typically, a VoIP service provider will operate a VoIP network that can facilitate a VoIP call that traverses both PSTN networks and packet switched networks like the Internet. The originator of a VoIP call may use a standard telephone connected to a first PSTN to dial a telephone number of another person on a second PSTN. A trunk line of the first PSTN connects to an originator gateway (server) that connects the first PSTN to a packet switched network, such as the Internet. The initiator gateway sends its position in the network along with the telephone number of the call recipient (within the second PSTN) to a route server, which determines which of many other gateways should be used to complete the call to the telephone number in the second PSTN and transmits this information to the initiator gateway. A call connection is then established between the originator gateway and a terminator gateway serving the second PSTN, which may involve routing the call through a number of intermediate servers on the Internet. The terminator gateway completes the call to the called party by connecting to the second PSTN.

The VoIP service provider typically generates revenue, at least in part, by buying and reselling call completion services. That is, when an originator gateway in the United States, for example, needs to complete a call to Luxembourg, for example, the VoIP provider will cause the originator gateway to send that call through a particular terminating gateway that can terminate the call off the Internet and complete it to its final destination in Luxembourg. The VoIP service provider will pay the terminating gateway operator a fee, say fifty cents per minute, for such termination services, but will charge the operator of the originator gateway fifty-five cents per minute, for example, for such termination services to Luxembourg. The five-cent difference is the VoIP service provider's profit.

The business model is viable in large part due to the fact that the various carriers that operate around the world often do not have individual contractual relationships with each other. The VoIP service provider thus acts, in a loose sense, as a matching service that matches those seeking to send calls to specific destinations, with those seeking to earn money by terminating such calls in those destinations. The contractual relationships that are required, however, are typically between the various carriers that operate the originating and terminating gateways, and the VoIP service provider.

If the VoIP service provider contracts for termination services with a particular terminating gateway operator, for a particular originating gateway, and the operator of the originating gateway does not pay the VoIP service provider for such services, the VoIP service provider will still be contractually bound to pay the terminating gateway operator. This results in loss of revenue, and often happens in the case of fraud or hacking. Specifically, if someone hacks into the local network connected to an originating gateway, they can send fraudulent calls to the VoIP service provider. The operator of the originating gateway may not pay for those calls, and the VoIP service provider will have contracted with a terminating gateway operator for completion of those calls. Hence, a loss of revenue to the VoIP service provider results.

Further, an originating gateway operator may be a small carrier without a sophisticated security system. It is thus often possible for a malicious source to breach a system and relay malicious traffic to the VoIP service provider, which appears to be legitimate customer traffic, without the customer (i.e., the originating gateway operator) even being aware. The VoIP service provider is ultimately responsible to remunerate the downstream service providers, and often the defrauded customer is too small to assume the financial losses, or not legally responsible.

One serious problem is that the fraudulent traffic may not be discovered until days or weeks later, when call detail records ("CDR") show an unusually high amount of traffic and unusually high charges to a specific destination, for example. Another problem is that the fraud that results in loss to the VoIP service provider is often fraud committed against one of the carriers' networks, not directly against the VoIP service provider. Hence, it is difficult for the VoIP service provider to manage it, even though the resulting loss is largely borne by the VoIP service provider.

The VoIP service provider must play a delicate balancing act between not being overzealous, allowing legitimate traffic from customers to flow to high risk (expensive) destinations even when the volume increases, and being exposed to significant financial losses if it does not properly and quickly react to situations that do, in fact, involve fraudulent traffic from trusted customers.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein a method that unwanted calls based on information shared between a first telecommunications network provided by a first service provider and a second service provider providing a second telecommunications network includes receiving, by a data-processing system, a request to provide a telecommunications service to the first telecommunications network, the request being received by the first telecommunications network from a user of the first telecommunications network through a first gateway, and wherein the request comprises a calling party identification that identified a calling party and a called party identification that identified a called party. The method further includes examining, by the data-processing system, statistics relating to requests for telecommunications services, and generating, by the data-processing system, a first signal when the called party identification in the request appears in the statistics in excess of a predetermined first number of instances within a predetermined first time interval.

In another embodiment disclosed herein a method that detects unwanted calls based on information shared between a first telecommunications network provided by a first service provider and a second service provider providing a second telecommunications network includes receiving, by a data-processing system, a request to provide a telecommunications service to the first telecommunications network, the request being received by the first telecommunications network from a user of the first telecommunications network through a first gateway, and wherein the request comprises a calling party identification that identified a calling party and a called party identification that identified a called party. The method further includes examining, by the data-processing system, statistics relating to requests for telecommunications services, and generating, by the data-processing system, a first signal when a same calling party identification as in the request appears in the statistics as calling a same called party identification as in the request, in excess of a predetermined first number of instances within a first time interval.

In another embodiment disclosed herein, a server computer that detects unwanted calls based on information shared between a first telecommunications network provided by a first service provider and a second service provider providing a second telecommunications network, the server computer includes a receiver configured to receive a request to provide a telecommunications service to the first telecommunications network, the request being received by the first telecommunications network from a user of the first telecommunications network through a first gateway, and wherein the request comprises a calling party identification that identified a calling party and a called party identification that identified a called party. The server computer further includes a processor configured to: (a) examine statistics relating to requests for telecommunications services, and (b) generate a first signal when the called party identification in the request appears in the statistics in excess of a predetermined first number of instances within a predetermined first time interval.

In another embodiment disclosed herein, server computer that detects unwanted calls based on information shared between a first telecommunications network provided by a first service provider and a predetermined second service provider providing a predetermined second telecommunications network includes a receiver configured to receive a request to provide a telecommunications service to the first telecommunications network, the request being received by the first telecommunications network from a user of the first telecommunications network through a first gateway, and wherein the request comprises a calling party identification that identified a calling party and a called party identification that identified a called party. The server computer further includes a processor configured to: (a) examine statistics relating to requests for telecommunications services, and (b) generate a first signal when a same calling party identification in the request appears in the statistics as calling a same called party identification as in the request, in excess of a predetermined first number of instances within a first time interval.

BRIEF DESCRIPTION OF THE SEVERAL VIEWS OF THE DRAWINGS

The embodiments of the invention will be better understood from the following detailed description with reference to the drawings, which are not necessarily drawing to scale and in which:

FIG. 3 illustrates a beginning of flow chart of an exemplary embodiment of a process of detecting and blocking unwanted calls;

FIG. 4 further illustrates the flow chart of an exemplary embodiment of FIG. 3 of a process of detecting and blocking unwanted calls;

FIG. 5 further illustrates the flow chart of an exemplary embodiment of FIGS. 3-4 of a process of detecting and blocking unwanted calls; and FIG. 6 further illustrates the flow chart of an exemplary embodiment of FIGS. 3-5 of a process of detecting and blocking unwanted calls.

DETAILED DESCRIPTION

Figure 1:
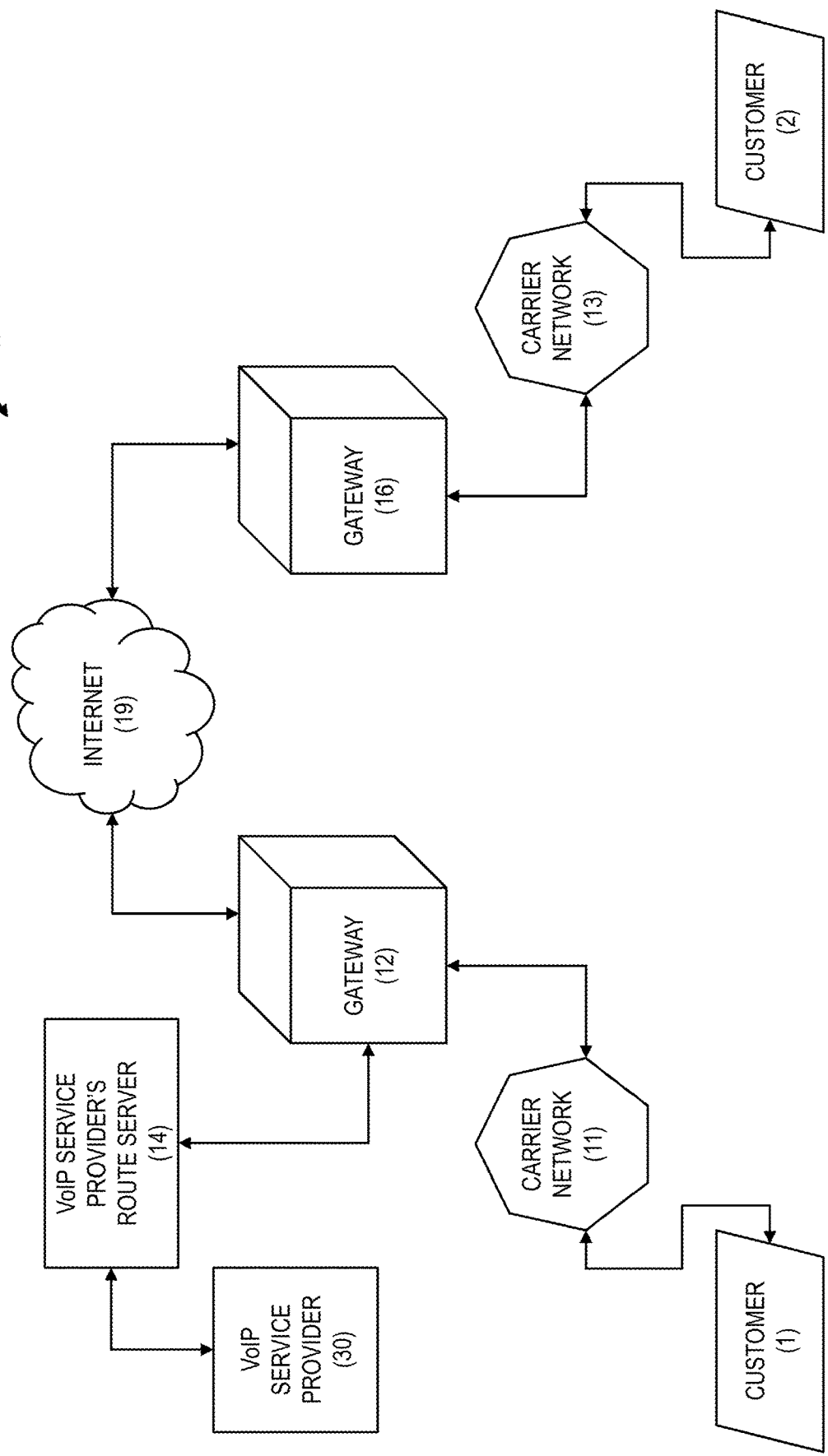
FIG. 1 illustrates a schematic block diagram of an exemplary embodiment of a telecommunications system.

Turning now to the drawings, FIG. 1 is a schematic block diagram illustrating telecommunications system 10, in accordance with the illustrative embodiment of the present disclosure. Only two gateways 12 and 16 are labeled shown for simplicity and purposes of explanation, although it is understood that in actuality, the gateways 12 and 16 may be part of a large network of such gateways disposed throughout the world.

Additionally, while gateways are discussed herein, the term gateway, as used herein, is not limited to the conventional meaning of a gateway, but instead is meant to encompass any network element that may communicate with another network element to convey a call over a network. Thus, switches, routers, etc. are also encompassed within such definition.

The connection of a call between users on PSTNs is provided as an example. Those skilled in the art will appreciate after reading this specification that the users need not necessarily communicate via a PSTN. In general, a call will be considered as originating with a customer of the VoIP service provider and being destined to a call recipient (regardless of the type of connection to the customer or the recipient).

A voice telecommunications customer 1, or other type of user, wishes to place a call to a voice customer 2, or other type of user. Customer 1 initiates the call over an originating carrier telecommunications network 11, (sometimes referred to as a "first telecommunications network"), which typically but not necessarily comprises a local PSTN network. The carrier network determines the call may be routed as a VoIP call through gateway 12. In furtherance thereof, the originating carrier telecommunications network 11 accesses gateway 12, which processes the call and passes it to a route server computer 14, operated by a VoIP service provider 30. Route server computer 14 is a commonly employed device that analyzes a call request and sets up a route, usually through a series of downstream gateways, for the transmission between customer 1 and customer 2. Route server computer 14 may communicate with all the gateways around the network via the Internet or some other private network.

When gateway 12 receives the call from customer 1, gateway 12 may contact route server computer 14 in order to obtain information instructing gateway 12 to where on Internet 19 (sometimes referred to as a "second telecommunications network") as the call should be routed. In some embodiments, Internet 19 exists in the public Internet, whereas in some other embodiments Internet 19 exists in a private network or dedicated network based on Internet Protocol (i.e., "private Internet"). A function of route server computer 14 may assign a terminating gateway, e.g., gateway 16, to complete the call. Media may then be transmitted from gateway 12 to gateway 16 over the Internet 19. Generally, each VoIP call to be routed over Internet 19 will include an originating gateway for placing the VoIP call on the Internet 19, and a terminating gateway (e.g., gateway 16) for taking the call off the Internet and completing it over a remote carrier network, shown as a target carrier telecommunications network 13 (sometimes referred to as a "third telecommunications network") in FIG. 1.

In FIG. 1, a single originating telecommunications network 11 and a single target carrier telecommunications network 13 are depicted. As those who are skilled in the art will appreciate after reading this specification, multiple originating networks and/or multiple terminating networks may be present, with each network having its own gateway between itself and Internet 19, and with the gateway of each originating network providing requests to route server computer 14. In one embodiment of the present disclosure, the statistics that are aggregated and examined for occurrences of patterns/events by route server computer 14, as described below and in regard to FIGS. 3-5, may involve calling-party identifications from multiple originating networks and/or called-party identifications from multiple terminating networks.

Although a VoIP network is featured, the unwanted-call detection and prevention disclosed herein may be applied to any network over which calls are routed, as those who are skilled in the art will appreciate after reading this specification.

In accordance with the illustrative embodiment, route server computer 14 incorporates unwanted-call detection programming (discussed further below), which determines whether to block or route the call, or determines whether to issue a warning (e.g., to VoIP service provider 30, to the operator of the originating carrier telecommunications network 11, etc.), or both. Should route server computer 14 choose to block the call, gateway 12 may inform service provider 30 and/or the operator of the originating carrier telecommunications network 11 as well. On the other hand, should route server computer 14 decide to route the call, its instructions include the planned route, and the call is transferred online, possibly through a series of gateways, until it reaches a gateway 16, to which customer 2 is connected. When customer 2 answers, connection of the call is completed.

In accordance with the illustrative embodiment, route server computer 14 operates in accordance with Session Initiation Protocol (SIP) and SIP-associated network queries. In one embodiment of the present disclosure, route server computer 14 operates and support network queries in accordance with other protocols (e.g., DNS, API, etc.).

As described above, if VoIP service provider 30, the operator of route server computer 14, causes the operator of the target carrier telecommunications network 13 to complete the call through gateway 16, then VoIP service provider 30 will incur liability to the operator of the target carrier telecommunications network 13. Consequently, if customer 1 hacked into the originating carrier telecommunications network 11, or if a rogue carrier hacked into gateway 12 by pretending to be the originating carrier telecommunications network 11, then service provider 30 will not be paid any revenue and will suffer a loss.

To attempt to detect unwanted calls (e.g., fraudulent calls, robo-calls, rapid calls, etc.) in or near real time, each request to route server computer 14 from a gateway is examined for a potential unwanted call, against past statistics, as described below and in regard to FIGS. 3-5. As those who are skilled in the art will appreciate after reading this specification, however, the examining process may be based on a different mechanism. For example, an examining of past statistics may be performed periodically (e.g., every 5 minutes, etc.) or sporadically, in addition to or instead of checking each request. It may be subjected to a series of tests, one or more of which result in a warning being issued to the originating carrier telecommunications network 11, although the call is nonetheless completed. The results of others of the tests may result in the call being blocked. In one embodiment of the present disclosure, if one or more first tests are passed, only then are the second one or more tests conducted.

The first one or more tests may relate to whether the call is destined for a predetermined geographic area. For example, certain destination areas present a higher risk of fraud (or other types of unwanted calls) since calls to such destinations are relatively costly, representing a more profitable alternative for fraudsters.

Figure 2:
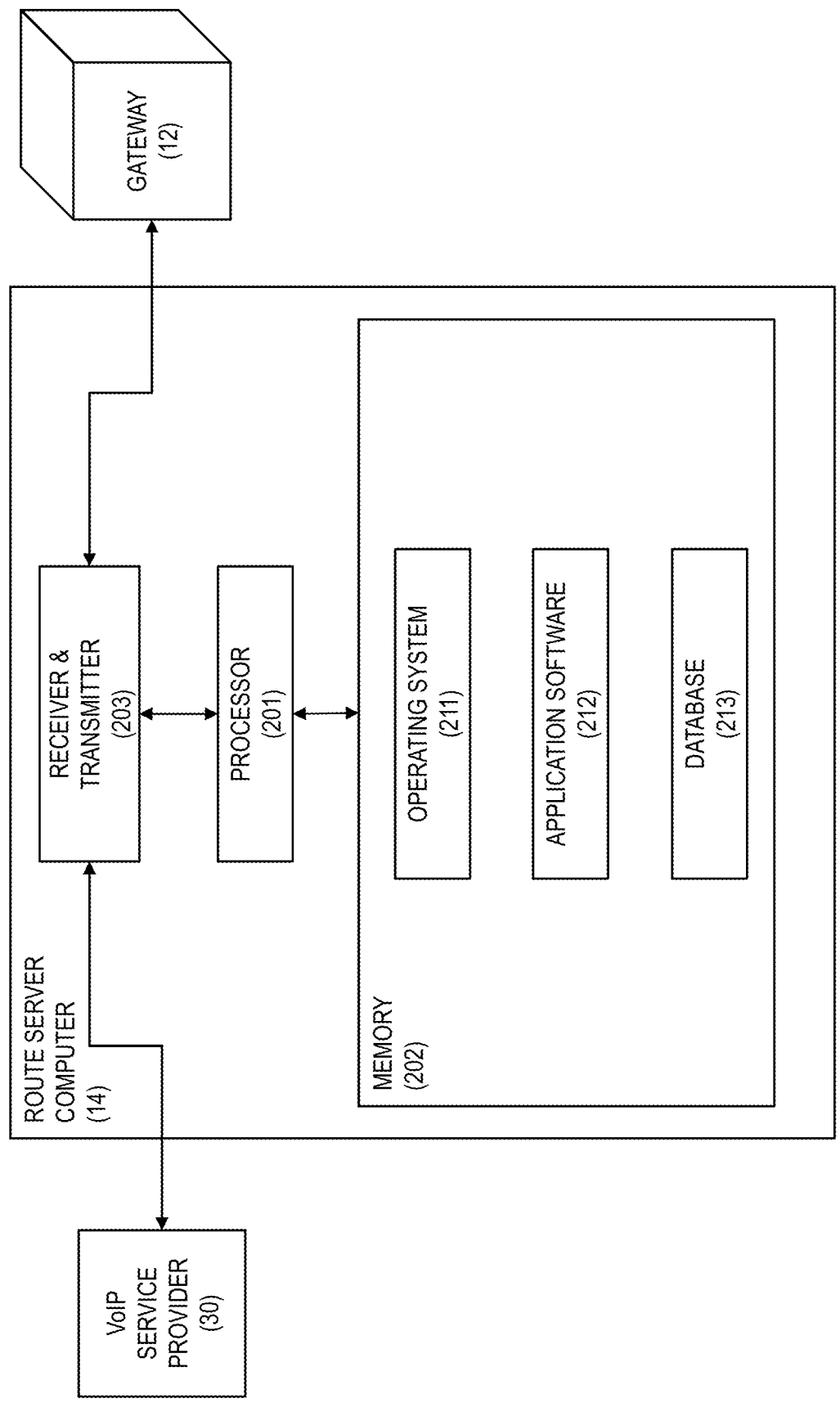
FIG. 2 illustrates a schematic diagram of route server computer 14 as depicted in FIG. 1.

FIG. 2 depicts a schematic diagram of route server computer 14, in accordance with the illustrative embodiment. Route server computer 14 may be implemented in hardware, software, or a combination of hardware and software. Although route server computer 14 is depicted as a single server computer, software components of the functionality disclosed herein may reside in multiple server computers, or in one or more like computing devices or machines, for that matter. The server computers or like computing devices or machines may comprise one or more central processing units (processors) and one or more memory devices. The structure and function of such server computers and the like are well known to those skilled in the art.

In accordance with the illustrative embodiment, route server computer 14 includes a processor 201, a memory 202, and a receiver and transmitter 203, which are interconnected as shown. In accordance with the illustrative embodiment, route server computer 14, being a server computer, is a data-processing system. As those who are skilled in the art will appreciate after reading this specification, however, route server computer 14 may be a different type of data-processing system than a server computer.

Processor 201 is a general-purpose processor that is configured to execute an operating system and the application software that performs the operations described herein, including at least some of the operations described below. It will be clear to those skilled in the art how to make and use processor 201.

Memory 202 is non-transitory and non-volatile computer storage memory technology that is well known in the art (e.g., flash memory, etc.). Memory 202 is configured to store operating system 211, application software 212, and database 213. The operating system is a collection of software that manages, in well-known fashion, the hardware resources route server computer 14 and provides common services for computer programs, such as those that constitute the application software. The application software that is executed by processor 201 enables route server computer 14 to perform the functions disclosed herein. Database 213 comprises statistics of past and incoming call requests (e.g., calling-party identifications, called-party identifications, etc.). It will be clear to those skilled in the art how to make and use memory 202.

Receiver and transmitter 203 is configured to enable route server computer 14 to receive from and transmit to other elements within telecommunications system 10, including gateway 12 and equipment within the network of service provider 30, for example and without limitation. It will be clear to those skilled in the art how to make and use receiver and transmitter 203.

FIGS. 3-6 illustrate a single flowchart of an exemplary process 300 for detecting and blocking unwanted calls in accordance with the illustrative embodiment. In one embodiment of the present disclosure, this process is performed at route server computer 14. The process 300 starts in FIG. 3 at block 302 where a device (e.g., customer 1) places a call, which is routed to a gateway such as gateway 12 of FIG. 1. The gateway 12 queries the route server for a route for a call it wants to place. Usually, this route involves supplying gateway 12 with the IP address of a gateway capable of terminating the call.

In regard to method 300, as well as to any other methods disclosed herein, it will be clear to those having ordinary skill in the art, after reading the present disclosure, how to make and use alternative embodiments of the disclosed methods wherein the recited operations, sub operations, and messages are differently sequenced, grouped, or sub divided—all within the scope of the present invention. Also, it will be further clear to those skilled in the art, after reading the present disclosure, how to make and use alternative embodiments of the disclosed methods wherein at least some of the described operations, sub operations, and messages are optional, are omitted, or are performed by other elements and/or systems.

In accordance with operation 304, route server computer 14 receives a message comprising a calling-party identification (ID) and a called-party ID. The message may be a request to provide a telecommunications service, such as a call setup from customer 1 to customer 2. The calling-party ID may be a string of digits (e.g., an A-Number, ANI (automatic number identification), etc.) or a string of characters in general (e.g., an email address of the sender, etc.). The called-party ID may be a string of digits (e.g., an B-Number, DNIS (dialed number identification service), etc.) or a string of characters in general (e.g., an email address of the intended recipient, etc.). As those who are skilled in the art will appreciate, after reading this specification, the calling-party ID and called-party ID may be in any format that identifies the calling party and called party, respectively.

In accordance with the illustrative embodiment, the calling-party ID and called-party ID are provided via gateway 12 to route server computer 14 in a request to provide service. As those who are skilled in the art will appreciate after reading this specification, however, the calling-party ID and/or called-party ID may be provided to route server computer 14 in a different way (e.g., a different type of request, a different message entirely, from something other than gateway 12, etc.).

In accordance with operation 306, route server computer 14 examines statistics relating to received calling-party IDs and/or received called-party IDs. In accordance with the illustrative embodiment, the statistics are accumulated over time and based on receiving various requests from gateway 12, which requests comprise calling-party IDs and/or called-party IDs. In accordance with the illustrative embodiment, route server computer 14 examines the statistics in response to each message received at operation 304. In one embodiment of the present invention, however, route server computer 14 may examine 306 the statistics periodically (e.g., every 5 minutes, etc.) or sporadically, instead of or in addition to in response to each message received at operation 304. Also, route server computer 14 may examine the statistics at operation 306 in response to a message being received, but not necessarily each message received (e.g., every Lth message, etc.).

In accordance with the illustrative embodiment, the examined calling statistics at operation 306 are for all types of calls, including both completed calls and non-completed calls. For example, by including non-completed calls, route server computer 14 may analyze calls in a pre-CDR fashion, thereby detecting even non-answered, blocked traffic as it is, in many cases, a precursor to fraudulent traffic within minutes. For example, a hacker prior to completing calls will "war-dial" thousands of high-rate (cost per minute) numbers in an effort to find a number with a high enough payback. In some alternative embodiments of the present disclosure, a subset of the calls may be excluded from being examined (e.g., exclude all calls other than those completed, etc.).

In accordance with operation 308, in response to examining the statistics 306, route server computer 14 may determine whether the same called-party ID appears in more than "L" instances (e.g., 20 instances, etc.) within "M" units of time (e.g., 10 seconds, etc.). If so, control of task execution proceeds to operation 310 to generate a first signal.

In accordance with operation 310, the route server computer 14 generates a first signal on the basis of the same called-party ID appearing in more than "L" instances within "M" units of time. In accordance with operation 312, route server computer 14 takes a predetermined action (e.g., block the call being requested, trigger an alarm, transmit a warning, etc.), in response to the first signal being generated according to operation 310.

Alternatively, in accordance with operation 308, if route server computer 14 determines the same calling-party ID does not appear in more than "L" instances (e.g., 20 instances, etc.), and/or within "M" units of time (e.g., 10 seconds, etc.), control of task execution proceeds to operation 316, where in response to examining the statistics, route server computer 14 determines whether the same calling-party ID appears in more than "N" instances (e.g., 20 instances, etc.) within "O" units of time (e.g., 10 seconds, etc.).

If so, control of task execution proceeds to operation 310 to generate a first signal, as described above, and then to operation 312 take a predetermined action (e.g., block the call being requested, trigger an alarm, transmit a warning, etc.), in response to the operation 310 where the first signal is generated.

In accordance with one illustrative embodiment, the values represented by "L" and "N" may be equal, and "M" and "O" may be equal. In another alternative embodiment, the values represented by "L" and "N", and/or "M" and "O" may have different values.

In one embodiment, for example, the value of "L" and/or "N" may be based on how quickly a human dialer may dial a called-party ID. For example, "L" and "N" may be set to a value of "20 instances" if "M" and "O" are set to a value of 10 seconds. This example assumes that it would be impossible for a human dialer associated with an A-Number to dial 20 B-Numbers within 10 seconds and, therefore, any pattern fitting these parameters may be a machine, (e.g., robo-dialer, etc.), associated with the A-Number dialing the B-Numbers.

Figure 3:
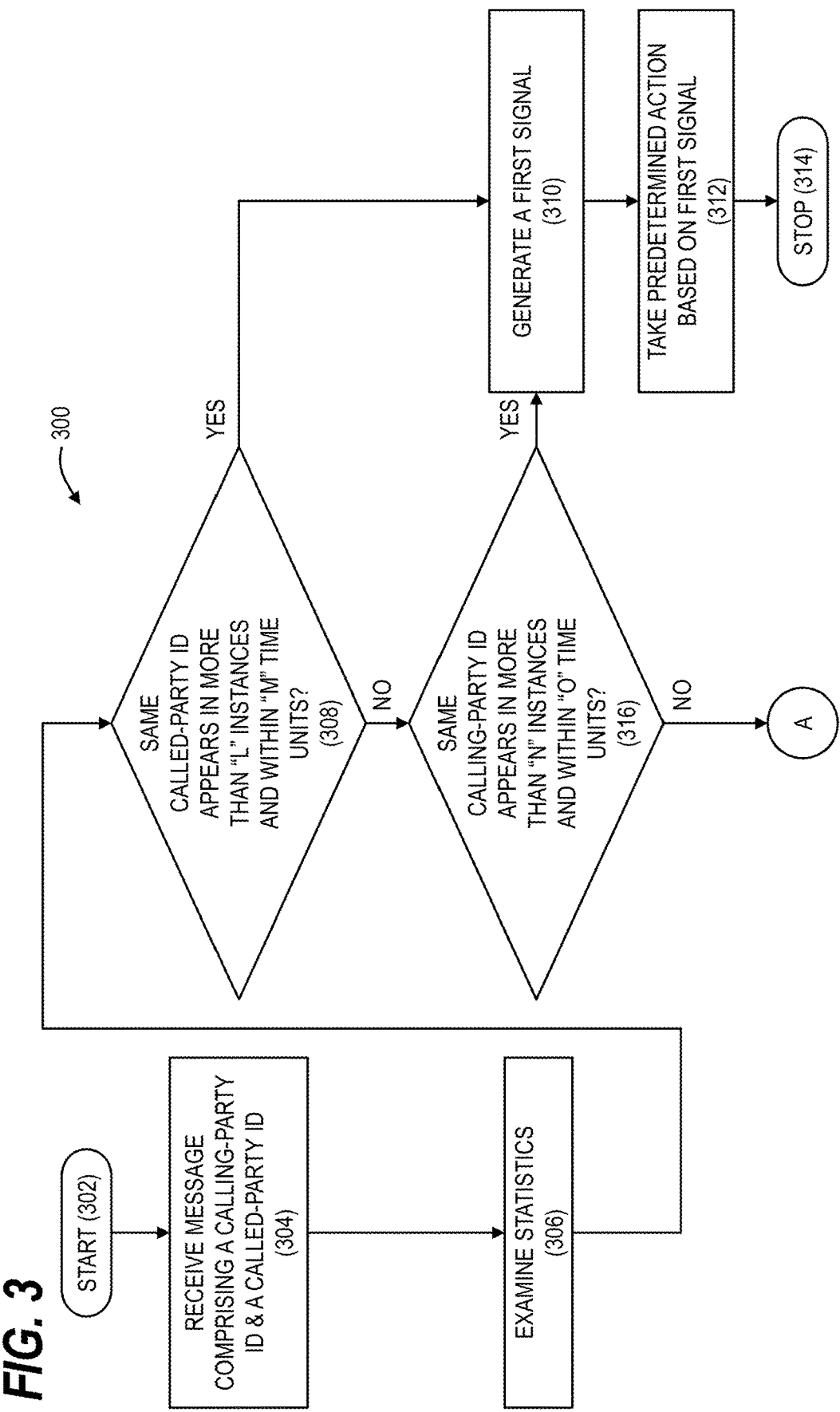
FIGS. 3-6 illustrates a multi-part flow chart of an exemplary embodiment of a process of detecting and blocking unwanted calls.
Figure 4:
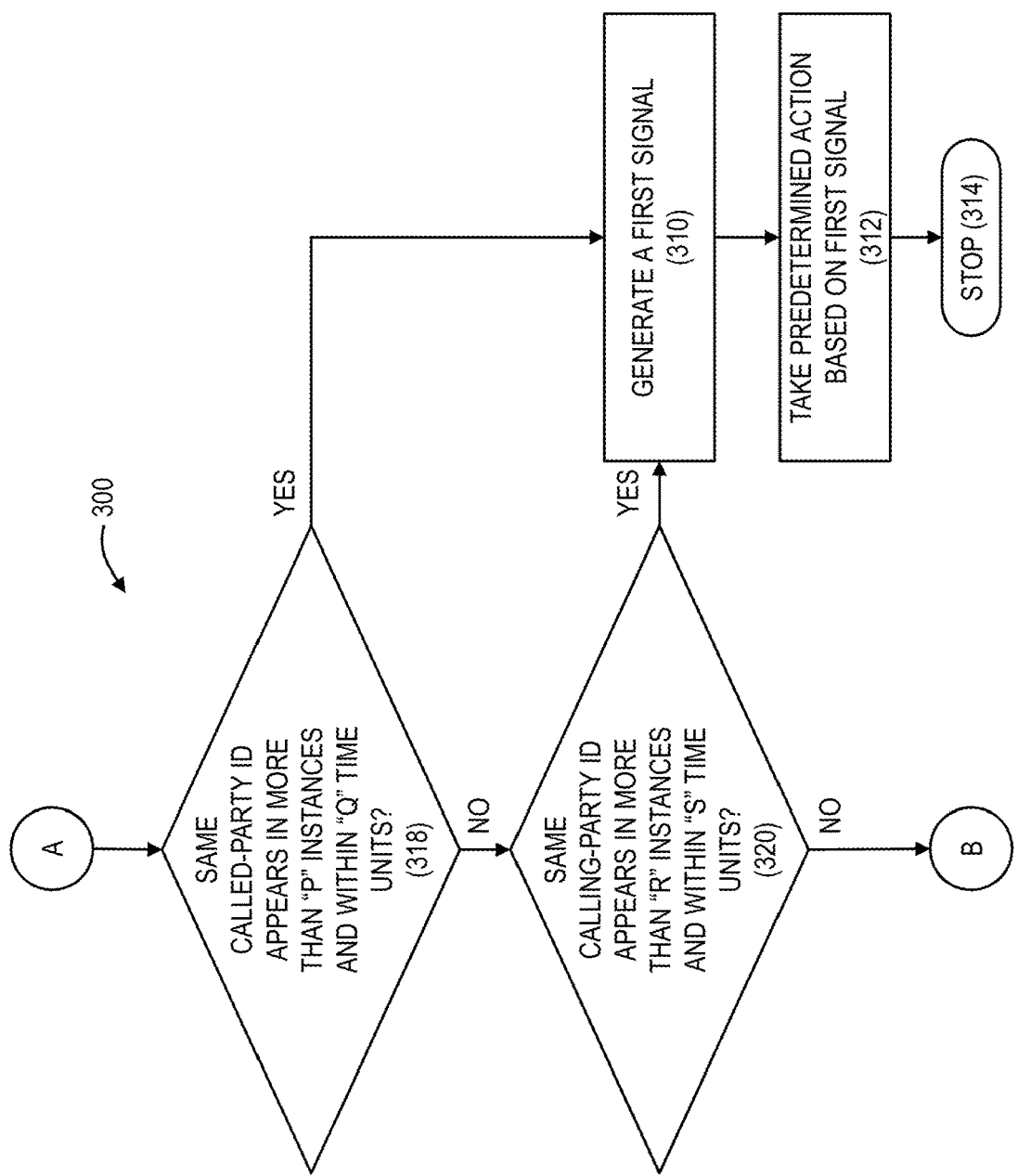

Alternatively, in accordance with operation 316, if route server computer 14 determines the same calling-party ID does not appear in more than "N" instances (e.g., 20 instances, etc.), and/or within "O" units of time (e.g., 10 seconds, etc.), control of task execution proceeds (via "A") to operation 318 illustrated in FIG. 4, where in response to the operation 306 of examining the statistics illustrated in FIG. 3, route server computer 14 determines whether the same called-party ID appears in more than "P" instances (e.g., 150 instances, etc.) within "Q" units of time (e.g., 15 minutes, etc.).

If so, control of task execution proceeds to operation 310 to generate a first signal and operation 312 take the any one or more of the above-identified predetermined actions based on the generated first signal.

Alternatively, in accordance with operation 318, if route server computer 14 determines the same calling-party ID does not appear in more than "P" instances (e.g., 150 instances, etc.), and/or within "Q" units of time (e.g., 15 minutes, etc.), control of task execution proceeds to operation 320, where in response to the operation 306 of examining the statistics, route server computer 14 determines whether the same calling-party ID appears in more than "R" instances (e.g., 150 instances, etc.) within "S" units of time (e.g., 15 minutes, etc.).

If so, control of task execution proceeds to operation 310 to generate a first signal and then to operation 312 to take at least one of the above-identified predetermined actions based on the generated first signal.

In accordance with one illustrative embodiment, the values represented by "P" and "Q" may have equal values, and "R" and "S" may have equal values. In another alternative embodiment, the values represented by "P" and "Q", and/or "R" and "S" may have different values.

The values of "P" and "Q" may be set very high, (or very different, in general), in relation to "R" and "S", respectively. These values may ensure that two different types of patterns in the statistics may be spotted, (i.e., one over a relatively short period of time, the other over a relatively long period of time).

Figure 5:
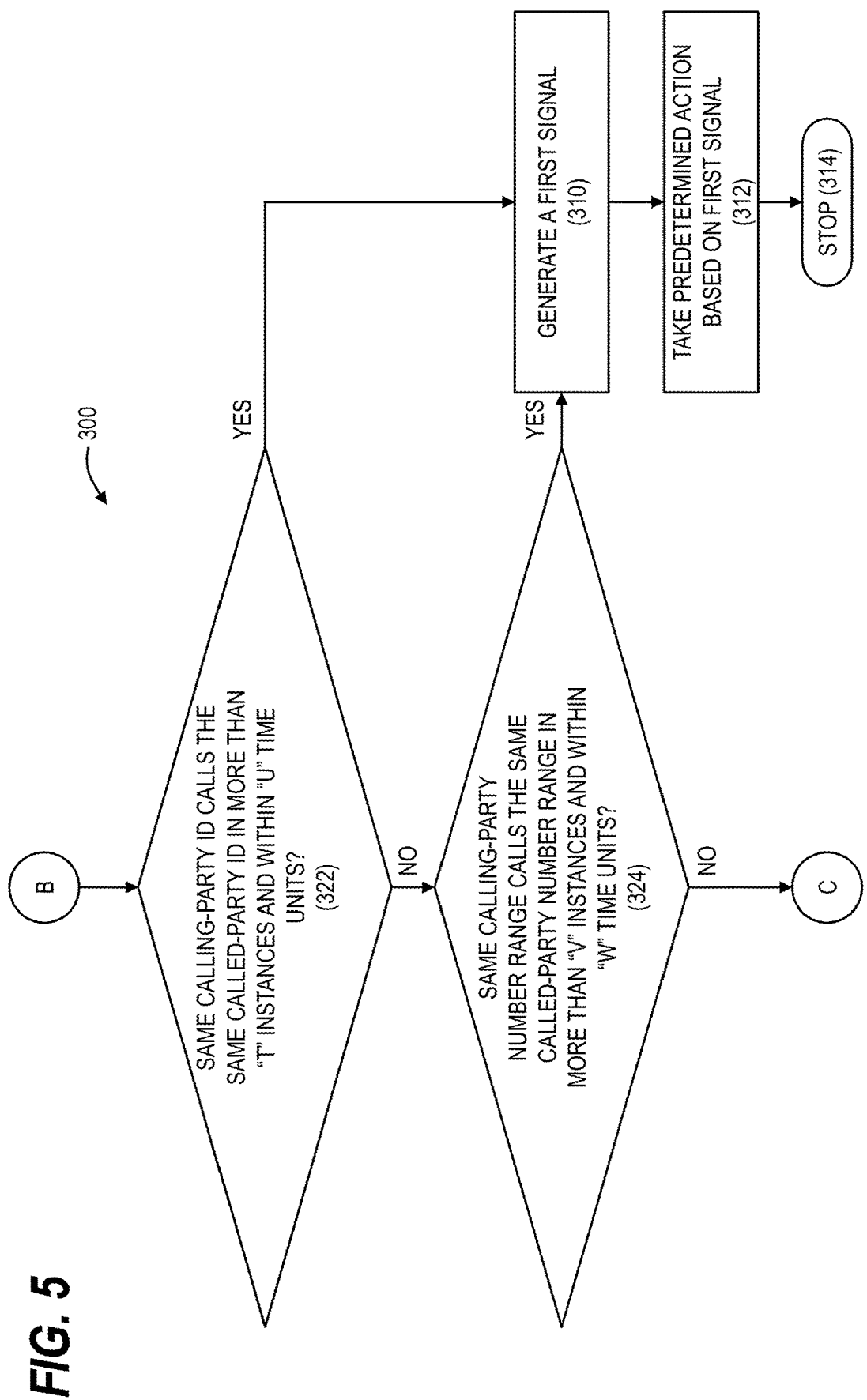

Alternatively, in accordance with operation 320, if route server computer 14 determines the same calling-party ID does not appear in more than "R" instances (e.g., 150 instances, etc.), and/or within "S" units of time (e.g., 15 minutes, etc.), control of task execution proceeds (via "B") to operation 322 of FIG. 5, where in response to the operation 306 of examining the statistics, route server computer 14 determines whether the same calling-party ID calls the same called-party ID in more than "T" instances (e.g., 10 instances, etc.) within "U" units of time (e.g., 10 seconds, etc.).

If so, control of task execution proceeds to operation 310 to generate a first signal, as described above, and then proceeds to operation 312 to take at least one of the above-identified predetermined actions in response to the first signal being generated.

Alternatively, in accordance with operation 322, if route server computer 14 determines whether the same calling-party does not call the same called-party in more than "T" instances (e.g., 10 instances, etc.), and/or within "U" units of time (e.g., 10 seconds, etc.), control of task execution proceeds to operation 324, where in response to examining the statistics, route server computer 14 determines whether the same calling-party number range calls the same called-party number range in more than "V" instances (e.g., 15 instances, etc.) within "W" units of time (e.g., 10 seconds, etc.).

If so, control of task execution proceeds operation 310 to generate a first signal, as described above, and then to operation 312 to take at least one of the above-identified predetermined actions in response to the first signal being generated.

In one embodiment of the present disclosure, the calling-party ID and/or called-party ID may refer to a collection of characters (e.g., digits, etc.) that is a proper subset of the characters in the full A-Number and/or B-Number, respectively. For example, route server computer 14 may ignore one or more digits (e.g., the last two digits, etc.) of the A-Number and/or B-Number, in order to determine whether the conditions in any or both of operations 322 and 324 are met, such as to test a range of numbers.

The embodiment illustrated in operation 324 of FIG. 5 may account for a team of multiple hackers or robo-callers who have been assigned a range of numbers requesting telecommunications services, for example and without limitation. In one embodiment of the present disclosure, the values of "V" and "W" may be set in order to account for the condition of operation 324 possibly being met more often, (given that a range of IDs is being examined), than the condition of operation 322 (given that a single calling and/or called ID is being examined), for a given interval of time.

Figure 6:
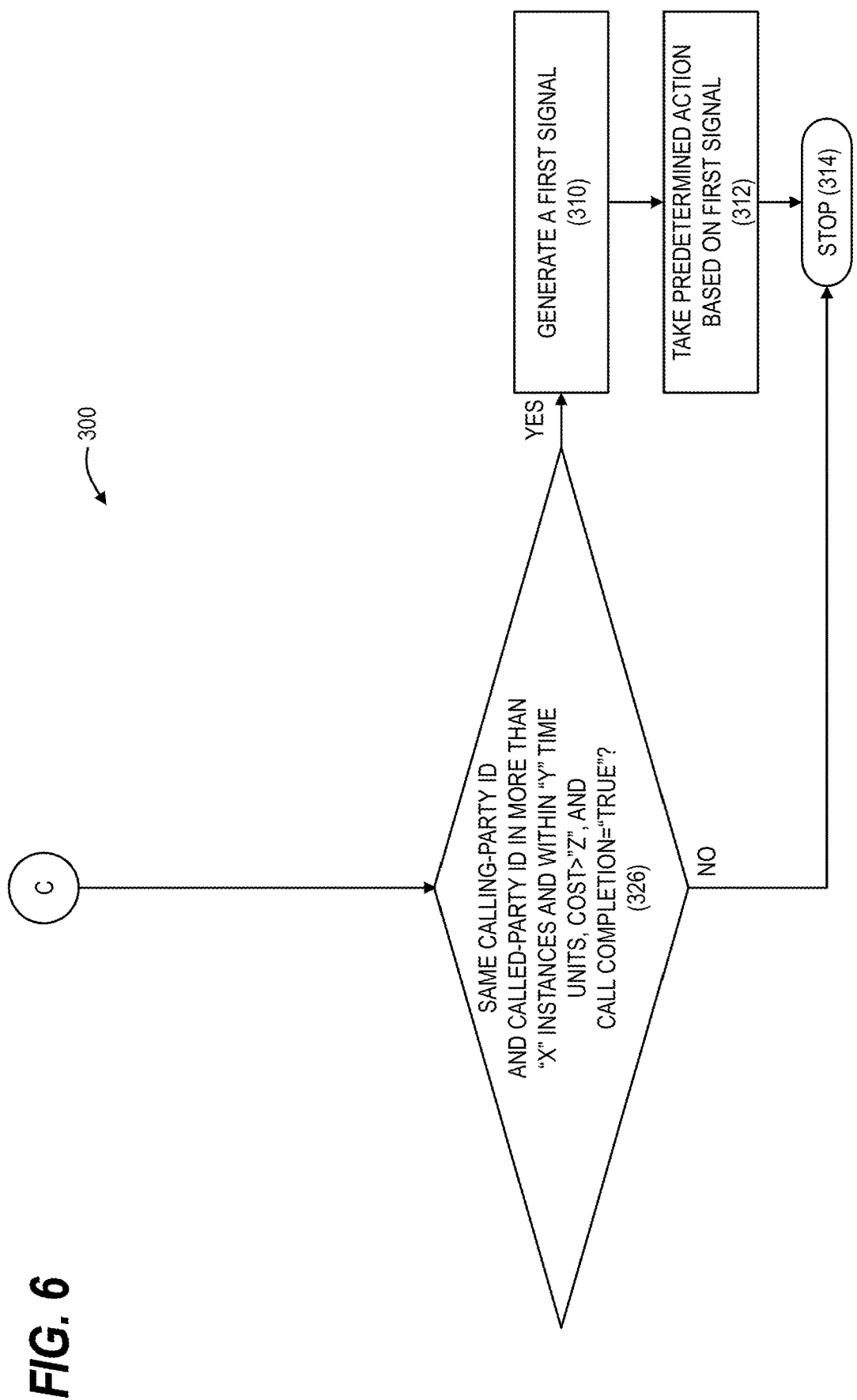

Alternatively, in accordance with operation 324, if route server computer 14 determines whether the same calling-party number range does not call the same called-party number range in more than "V" instances (e.g., 15 instances, etc.), and/or within "W" units of time (e.g., 10 seconds, etc.), control of task execution proceeds (via "C") to operation 326 of FIG. 6, where in response to operation 306 of examining the statistics, route server computer 14 determines whether: 1) the same calling-party number ID and the called-party ID occurs in more than "X" (e.g., 15 instances, etc.), 2) within "Y" units of time (e.g., 10 seconds, etc.), 3) at a cost greater than "Z" units of cost (e.g., 5.00 USD, etc.), and 4) the call completion status between the calling-party ID and the called-party ID is determined to be "TRUE" and not "FALSE" (where the call completion status represents of failed connection between the two parties).

If so, control of task execution proceeds operation 310 to generate a first signal, as described above, and then to operation 312 to take at least one of the above-identified predetermined actions in response to the first signal being generated. The above embodiment of operation 326 is designed to combat fraudulent activity where calls are sent to high cost destinations. Determining the call completion status as "TRUE" may place when the first gateway 12 provides a route(s) to a call.

Alternatively, if route server computer 14 in response to operation 306 of examining the statistics, determines in operation 326 that: 1) the same calling-party number ID and the called-party ID does not occur in more than "X" (e.g., 15 instances, etc.), and/or 2) is outside of "Y" units of time (e.g., 10 seconds, etc.), and/or 3) is at a cost equal to or less than "Z" units of cost (e.g., 50.00 USD, etc.), and/or 4) the call completion status between the calling-party ID and the called-party ID is determined to be "FALSE", then the operation proceeds to an endpoint stop 314.

In one embodiment of the present disclosure, the values of some or all of parameters L, M, N, O, P, Q, R, S, T, U, V, W, X, Y and Z discussed above are customizable (e.g., per customer, etc.). The values of some or all parameters may be based on one or more characteristics of the originating carrier telecommunications network 11 and/or the target carrier telecommunications network 13. For example, the values may be based on the type of access (e.g., wireless, landline, etc.) the network provides, the entity providing the network (e.g., Sprint, Verizon, etc.), the type of customers supported by the network (e.g., enterprise customers, individual consumers, etc.).

In another alternative embodiment, and in contrast to what is depicted in FIGS. 3-6, it may be the case that two or more of operations 308 and 316-326 may be required to be "true" in order for task execution to proceed to operations 310 and 312.

In another alternative embodiment, route server computer 14 may have the ability to test some or all of the suspect unwanted calls, based on the operation 310 of the first signal being generated. For example, once route server computer 14 identifies a robo-dialed or rapid-dialed number, in accordance with some or all of the aforementioned operations, (308 and 316-326), the router server computer 14 may then send the number (e.g., A-Number, B-Number, etc.) to an active probe (e.g., via an API, etc.) or other system. The active probe (i.e., active testing solution) validates whether the number is valid or not. For example, the validating may include analyzing audio received from the B-Number party, wherein the audio of an outgoing message from an interactive voice response system may suggest an unwanted call as opposed to the audio of a live voice suggesting a wanted call. As another example, the validating may include dialing back the A-Number to check its validity. The active probe supplies the status of the number back to route server computer 14 (e.g., via API, etc.). Route server computer 14 may then take an action in accordance with operation 312 (e.g., block/reject, alert/alarm, do nothing, etc.) further based on the status reported by the active probe.

In one embodiment of the present disclosure, and consistent with the operations, (e.g., 308 and 316-326), described above that involve analyzing the called-party ID or calling-party ID, route server computer 14 may perform tests to determine whether the called party is in a "high risk" destination, (e.g., a particular country or region of the world, etc.). A "high risk" destination may be understood as one that incurs high downstream fees or, based upon historical information, one that may have been a target for fraudulent calls, for example and without limitation.

In one embodiment of the present disclosure, VoIP service provider 30 may request verification for routing of future calls from a particular calling number (e.g., one that may have been determined to be generating unwanted calls, etc.). In this manner, calls from what appears to be a legitimate source will not be blocked, but if the traffic from that source appears suspicious, the originating carrier will have to verify that traffic going forward. Optionally, VoIP service provider 30 could block such calls in the future if proper verification is not provided. Such a measure strikes a balance between blocking what might be legitimate calls from a real customer, with avoiding a huge accumulation of fees owed to the VoIP provider that, if the source is not legitimate, may not be paid.

It may be understood that the disclosure teaches just one example of the illustrative embodiment and that many variations of the invention may easily be devised by those skilled in the art after reading this disclosure and that the scope of the present invention may be determined by the following claims.

What is claimed is:

1. A method that detects unwanted calls based on information shared between a first telecommunications network provided by a first service provider and a second service provider providing a second telecommunications network, the method comprising:

receiving, by a data-processing system, a request to provide a telecommunications service to the first telecommunications network, the request being received by the first telecommunications network from a user of the first telecommunications network through a first gateway, and wherein the request comprises a calling party identification that identified a calling party and a called party identification that identified a called party;

examining, by the data-processing system, statistics relating to requests for telecommunications services; and generating, by the data-processing system, a first signal when the called party identification in the request appears in the statistics in excess of a predetermined first number of instances within a predetermined first time interval, and wherein the first signal is generated when the calling party identification in the request appears in the statistics in excess of the predetermined first number of instances within the predetermined first time interval, and when the called party identification in the request appears in the statistics in excess of a predetermined second number of instances within a predetermined second time interval.

2. The method according to claim 1, wherein the first signal is generated when the calling party identification in the request appears in the statistics in excess of the predetermined second number of instances within the predetermined second time interval.

3. The method according to claim 1, wherein the first signal is generated when a same calling party identification as in the request appears in the statistics as calling a same called party identification as in the request, in excess of a third number of instances within a third time interval.

4. The method according to claim 1, wherein the called party identification comprises digits that define the called party identification, the digits being a proper subset of digits that define a B-Number of the called party.

5. The method according to claim 1, wherein the calling party identification comprises digits that define the calling party identification, the digits being a proper subset of digits that define an A-Number of the calling party.

6. The method according to claim 1, further comprising denying the telecommunications service to the user of the first telecommunications network, based on the first signal being generated.

7. The method according to claim 1, wherein the predetermined first number of instances is based on a characteristic of the first telecommunications network.

8. The method according to claim 1, wherein the predetermined first number of instances is based on a characteristic of a third telecommunications network that corresponds to the called party identification.

9. A method that detects unwanted calls based on information shared between a first telecommunications network provided by a first service provider and a second service provider providing a second telecommunications network, the method comprising:
receiving, by a data-processing system (14), a request to provide a telecommunications service to the first telecommunications network, the request being received by the first telecommunications network from a user of the first telecommunications network through a first gateway, and wherein the request comprises a calling party identification that identified a calling party and a called party identification that identified a called party;
examining, by the data-processing system, statistics relating to requests for telecommunications services; and
generating, by the data-processing system, a first signal when a same calling party identification as in the request appears in the statistics as calling a same called party identification as in the request, in excess of a predetermined first number of instances within a first time interval, and wherein the first signal is generated when the calling party identification in the request appears in the statistics in excess of the predetermined first number of instances within the predetermined first time interval, and when the called party identification appears in the statistics in excess of a predetermined second number of instances within a predetermined second time interval.

10. The method according to claim 9, wherein the called party identification comprises digits that define the called party identification, the digits being a proper subset of digits that define a B-Number of the called party.

11. The method according to claim 9, wherein the calling party identification comprises digits that define the calling party identification, the digits being a proper subset of digits that define an A-Number of the calling party.

12. The method according to claim 9, further comprising denying the telecommunications service to the user of the first telecommunications network, based on the first signal being generated.

13. The method according to claim 9, wherein the predetermined first number of instances is based on a characteristic of the first telecommunications network.

14. The method according to claim 9, wherein the predetermined first number of instances is based on a characteristic of a third telecommunications network that corresponds to the called party identification.

15. A server computer that detects unwanted calls based on information shared between a first telecommunications network provided by a first service provider and a second service provider providing a second telecommunications network, the server computer comprising:
a receiver configured to receive a request to provide a telecommunications service to the first telecommunications network, the request being received by the first telecommunications network from a user of the first telecommunications network through a first gateway, and wherein the request comprises a calling party identification that identified a calling party and a called party identification that identified a called party; and
a processor configured to:
(a) examine statistics relating to requests for telecommunications services, and
(b) generate a first signal when the called party identification in the request appears in the statistics in excess of a predetermined first number of instances within a predetermined first time interval,
(c) generate the first signal when the calling party identification in the request appears in the statistics in excess of the predetermined first number of instances within the predetermined first time interval, and when the called party identification appears in the statistics in excess of a predetermined second number of instances within a predetermined second time interval.

16. The server computer according to claim 15, wherein the first signal is generated when the calling party identification in the request appears in the statistics in excess of the predetermined second number of instances within the predetermined second time interval.

17. The server computer according to claim 15, wherein the first signal is generated when a same calling party identification as in the request appears in the statistics as calling a same called party identification as in the request, in excess of a third number of instances within a third time interval.

18. The server computer according to claim 15, wherein the called party identification comprises digits that define the called party identification, the digits being a proper subset of digits that define a B-Number of the called party.

19. The server computer according to claim 15, wherein the calling party identification comprises digits that define the calling party identification, the digits being a proper subset of digits that define an A-Number of the calling party.

20. The server computer according to claim 15, further comprising a transmitter configured to transmit a message denying the telecommunications service, based on the first signal being generated.

21. The server computer according to claim 15, wherein the predetermined first number of instances is based on a characteristic of the first telecommunications network.

22. The server computer according to claim 15, wherein the predetermined first number of instances is based on a characteristic of a third telecommunications network that corresponds to the called party identification.

23. A server computer that detects unwanted calls based on information shared between a first telecommunications network provided by a first service provider and a predetermined second service provider providing a predetermined second telecommunications network, the method comprising:

a receiver configured to receive a request to provide a telecommunications service to the first telecommunications network, the request being received by the first telecommunications network from a user of the first telecommunications network through a first gateway, and wherein the request comprises a calling party identification that identified a calling party and a called party identification that identified a called party;

and a processor configured to:
(a) examine statistics relating to requests for telecommunications services, and
(b) generate a first signal when the called party identification in the request appears in the statistics in excess of a predetermined first number of instances within a predetermined first time interval,
(c) generate the first signal when a same calling party identification in the request appears in the statistics as calling a same called party identification as in the request, in excess of the predetermined first number of instances within the first time interval, and when the called party identification appears in the statistics in excess of a predetermined second number of instances within a predetermined second time interval.

24. The server computer according to claim 23, wherein the called party identification comprises digits that define the called party identification, the digits being a proper subset of digits that define a B-Number of the called party.

25. The server computer according to claim 23, wherein the calling party identification comprises digits that define the calling party identification, the digits being a proper subset of digits that define an A-Number of the calling party.

26. The server computer according to claim 23, further comprising a transmitter configured to transmit a message denying the telecommunications service, based on the first signal being generated.

27. The server computer according to claim 23, wherein the predetermined first number of instances is based on a characteristic of the first telecommunications network.

28. The server computer according to claim 23, wherein the predetermined first number of instances is based on a characteristic of a third telecommunications network that corresponds to the called party identification.

* * * * *